(12) United States Patent
Choi et al.

(10) Patent No.: US 12,531,310 B2
(45) Date of Patent: *Jan. 20, 2026

(54) SEPARATOR FOR LITHIUM SECONDARY BATTERY, AND LITHIUM SECONDARY BATTERY INCLUDING SAME

(71) Applicant: Samsung SDI Co., Ltd., Yongin-si (KR)

(72) Inventors: Yeonjoo Choi, Yongin-si (KR); Gain Kim, Yongin-si (KR); Yangseob Kim, Yongin-si (KR); Yongkyoung Kim, Yongin-si (KR); Dongwan Seo, Yongin-si (KR); Jungyoon Lee, Yongin-si (KR); Hyeonsun Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 780 days.

This patent is subject to a terminal disclaimer.

(21) Appl. No.: 17/273,238

(22) PCT Filed: Jul. 16, 2019

(86) PCT No.: PCT/KR2019/008767
§ 371 (c)(1),
(2) Date: Mar. 3, 2021

(87) PCT Pub. No.: WO2020/060018
PCT Pub. Date: Mar. 26, 2020

(65) Prior Publication Data
US 2021/0226299 A1 Jul. 22, 2021

(30) Foreign Application Priority Data
Sep. 18, 2018 (KR) .................. 10-2018-0111702

(51) Int. Cl.
*H01M 50/42* (2021.01)
*H01M 10/0525* (2010.01)
(Continued)

(52) U.S. Cl.
CPC ....... *H01M 50/42* (2021.01); *H01M 10/0525* (2013.01); *H01M 50/434* (2021.01);
(Continued)

(58) Field of Classification Search
CPC ............. H01M 50/449; H01M 50/446; H01M 50/443; H01M 50/411; H01M 50/42;
(Continued)

(56) References Cited

U.S. PATENT DOCUMENTS

2006/0263693 A1  11/2006  Kim et al.
2010/0233409 A1   9/2010  Kamiya et al.
(Continued)

FOREIGN PATENT DOCUMENTS

CN       1855584 A    11/2006
CN     102770984 A    11/2012
(Continued)

OTHER PUBLICATIONS

Machine translation of Japanese Patent Publication No. 2018-026266, published Feb. 15, 2018. (Year: 2018).*
(Continued)

*Primary Examiner* — Miriam Stagg
*Assistant Examiner* — Lilia Nedialkova
(74) *Attorney, Agent, or Firm* — Womble Bond Dickinson (US) LLP

(57) ABSTRACT

Disclosed is a separator for a lithium secondary battery including a porous substrate, and a coating layer on at least one surface of the porous substrate, wherein the coating layer includes an acrylic copolymer including a first structural unit derived from (meth)acrylamide, and a second
(Continued)

structural unit including at least one of a structural unit derived from (meth)acrylic acid and (meth)acrylate, and a structural unit derived from (meth)acrylamidosulfonic acid and a salt thereof, the first structural unit is included in an amount of 55 mol % to 95 mol % with respect to 100 mol % of the acrylic copolymer, and the second structural unit is included in an amount of 5 mol % to 45 mol % with respect to 100 mol % of the acrylic copolymer, and a lithium secondary battery including the same.

13 Claims, 1 Drawing Sheet

(51) Int. Cl.
  *H01M 50/434* (2021.01)
  *H01M 50/443* (2021.01)
  *H01M 50/446* (2021.01)
  *H01M 50/451* (2021.01)
(52) U.S. Cl.
  CPC ....... *H01M 50/443* (2021.01); *H01M 50/446* (2021.01); *H01M 50/451* (2021.01)
(58) Field of Classification Search
  CPC ............. H01M 50/434; H01M 50/451; H01M 10/052; H01M 10/0525; Y02E 60/10
  See application file for complete search history.

(56) References Cited

U.S. PATENT DOCUMENTS

| | | |
|---|---|---|
| 2011/0318630 A1 | 12/2011 | Wakizaka et al. |
| 2012/0115036 A1 | 5/2012 | Lee et al. |
| 2013/0017429 A1 | 1/2013 | Ha et al. |
| 2013/0224555 A1 | 8/2013 | Hong et al. |
| 2013/0252066 A1 | 9/2013 | Yeou et al. |
| 2013/0302661 A1 | 11/2013 | Kim et al. |
| 2013/0323569 A1 | 12/2013 | Yeou et al. |
| 2013/0330590 A1 | 12/2013 | Toyoda |
| 2014/0050965 A1 | 2/2014 | Ha et al. |
| 2014/0120402 A1 | 5/2014 | Yu et al. |
| 2014/0186680 A1 | 7/2014 | Kim et al. |
| 2014/0272532 A1 | 9/2014 | Park et al. |
| 2015/0010815 A1 | 1/2015 | Chung et al. |
| 2015/0030933 A1 | 1/2015 | Goetzen et al. |
| 2015/0050554 A1 | 2/2015 | Fukumine et al. |
| 2015/0111086 A1 | 4/2015 | Arnold et al. |
| 2016/0013465 A1 | 1/2016 | Akiike |
| 2016/0141581 A1 | 5/2016 | Sasaki et al. |
| 2016/0149184 A1 | 5/2016 | Nam et al. |
| 2016/0149190 A1 | 5/2016 | Fukuchi |
| 2016/0344007 A1 | 11/2016 | Toyoda et al. |
| 2017/0162848 A1 | 6/2017 | Pan et al. |
| 2017/0200932 A1 | 7/2017 | Sasaki et al. |
| 2017/0301903 A1 | 10/2017 | Choi et al. |
| 2017/0326863 A1 | 11/2017 | Wang et al. |
| 2017/0338461 A1 | 11/2017 | Seo et al. |
| 2018/0053963 A1 | 2/2018 | Tanaka |
| 2018/0114966 A1 | 4/2018 | Yasuda et al. |
| 2018/0337381 A1 | 11/2018 | Seo et al. |
| 2018/0351149 A1 | 12/2018 | Akiike et al. |
| 2018/0358649 A1 | 12/2018 | Inoue et al. |
| 2019/0013504 A1 | 1/2019 | Choi et al. |
| 2019/0106521 A1 | 4/2019 | Takamatsu |
| 2019/0245183 A1 | 8/2019 | Jeong et al. |
| 2020/0388808 A1 | 12/2020 | Choi et al. |
| 2021/0226299 A1 | 7/2021 | Choi et al. |
| 2021/0234235 A1 | 7/2021 | Kang et al. |
| 2022/0013859 A1 | 1/2022 | Kim et al. |
| 2022/0029244 A1 | 1/2022 | Kim et al. |
| 2022/0037739 A1 | 2/2022 | Lee et al. |
| 2022/0037741 A1 | 2/2022 | Lee et al. |
| 2022/0102810 A1 | 3/2022 | Kim et al. |

FOREIGN PATENT DOCUMENTS

| | | |
|---|---|---|
| CN | 102893427 A | 1/2013 |
| CN | 103390740 A | 11/2013 |
| CN | 103718336 A | 4/2014 |
| CN | 103857732 A | 6/2014 |
| CN | 104277746 A | 1/2015 |
| CN | 104521031 A | 4/2015 |
| CN | 105324868 A | 2/2016 |
| CN | 105378989 A | 3/2016 |
| CN | 105440770 A | 3/2016 |
| CN | 105551854 A | 4/2016 |
| CN | 105934838 A | 9/2016 |
| CN | 106328865 A | 1/2017 |
| CN | 106463675 A | 2/2017 |
| CN | 107394087 A | 11/2017 |
| CN | 107851765 A | 3/2018 |
| CN | 108155328 A | 6/2018 |
| CN | 108305970 A | 7/2018 |
| CN | 108463904 A | 8/2018 |
| CN | 108666499 A | 10/2018 |
| CN | 108963148 A | 12/2018 |
| CN | 109037564 A | 12/2018 |
| CN | 109075291 A | 12/2018 |
| CN | 109103397 A | 12/2018 |
| CN | 113228397 A | 8/2021 |
| EP | 2549564 A2 | 1/2013 |
| EP | 2779277 A1 | 9/2014 |
| EP | 3246969 A1 | 11/2017 |
| EP | 3588636 A1 | 1/2020 |
| EP | 3748730 A1 | 12/2020 |
| EP | 3855529 A1 | 7/2021 |
| EP | 3902027 A1 | 10/2021 |
| EP | 3902028 A1 | 10/2021 |
| EP | 3905381 A | 11/2021 |
| EP | 3907781 A1 | 11/2021 |
| JP | 03-175023 A | 7/1991 |
| JP | 2011-832 A | 1/2011 |
| JP | 2011-5670 A | 1/2011 |
| JP | 2014-225410 A | 12/2014 |
| JP | 2014-229406 A | 12/2014 |
| JP | 2015-088253 A | 5/2015 |
| JP | 2015-88253 A | 5/2015 |
| JP | 2016-105398 A | 6/2016 |
| JP | 2017-050149 A | 3/2017 |
| JP | 2017-103206 A | 6/2017 |
| JP | 2018-26266 A | 2/2018 |
| JP | 2018026266 A † | 2/2018 |
| JP | 2018-34496 A | 3/2018 |
| JP | 2018-092701 A | 6/2018 |
| JP | 2019-57486 A | 4/2019 |
| KR | 10-2010-0094062 A | 8/2010 |
| KR | 10-2011-0097715 A | 8/2011 |
| KR | 10-2011-0104791 A | 9/2011 |
| KR | 10-2012-0093772 A | 8/2012 |
| KR | 10-2012-0097238 A | 9/2012 |
| KR | 10-1254693 B1 | 4/2013 |
| KR | 10-2014-0044757 A | 4/2014 |
| KR | 10-2014-0116415 A | 10/2014 |
| KR | 10-2014-0147742 A | 12/2014 |
| KR | 10-2015-0034825 A | 4/2015 |
| KR | 10-2015-0037394 A | 4/2015 |
| KR | 10-2016-0033692 A | 3/2016 |
| KR | 10-2016-0061165 A | 5/2016 |
| KR | 10-2016-0109669 A | 9/2016 |
| KR | 10-2016-0118979 A | 10/2016 |
| KR | 10-2017-0003020 A | 1/2017 |
| KR | 10-2017-0045438 A | 4/2017 |
| KR | 10-2017-0084597 A | 7/2017 |
| KR | 10-2017-0095024 A | 8/2017 |
| KR | 10-2017-0129645 A | 11/2017 |
| KR | 10-2018-0003177 A | 1/2018 |
| KR | 10-1868240 B1 | 6/2018 |
| KR | 10-2018-0099560 A | 9/2018 |
| KR | 10-2018-0099561 A | 9/2018 |
| KR | 10-2018-0109740 A | 10/2018 |
| WO | WO 2009/060787 A1 | 5/2009 |
| WO | WO 2010/074205 A1 | 7/2010 |
| WO | 2014/054919 A1 | 4/2014 |

(56) References Cited

FOREIGN PATENT DOCUMENTS

| WO | 2014/136799 A1 | 9/2014 | | |
|---|---|---|---|---|
| WO | 2015008626 A1 † | 1/2015 | | |
| WO | 2015/076571 A1 | 5/2015 | | |
| WO | WO-2015122322 A1 * | 8/2015 | ............ | C08J 7/0427 |
| WO | 2016/157899 A1 | 10/2016 | | |
| WO | WO 2018/147714 A1 | 8/2018 | | |
| WO | WO 2018/155345 A1 | 8/2018 | | |

OTHER PUBLICATIONS

Machine translation of WIPO Patent Publication WO 2015/122322 A1, published Aug. 20, 2015. (Year: 2015).*
Machine translation of WIPO Patent Publication 2015-008626, published Jan. 22, 2015. (Year: 2015).*
International Search Report for corresponding Application No. PCT/KR2019/008767 dated Oct. 25, 2019, 4pp.
Chinese Office Action, with English translation, dated Sep. 19, 2023, issued in Chinese Patent Application No. 201980087908.1 (19 pages).
Chinese Notice of Allowance, with English translation, dated Sep. 27, 2023, issued in Chinese Patent Application No. 201980085835.2 (6 pages).
Chinese Office Action, with English translation, dated Sep. 20, 2022, issued in Chinese Patent Application No. 201980083245.6 (28 pages).
Chinese Office Action, with English translation, dated Sep. 30, 2022, issued in Chinese Patent Application No. 201980085835.2 (15 pages).
EPO Extended European Search Report dated Oct. 14, 2022, issued in European Patent Application No. 19904249.0 (9 pages).
Chinese Office Action, with English translation, dated Oct. 24, 2022, issued in Chinese Patent Application No. 201980087908.1 (18 pages).
EPO Extended European Search Report dated Dec. 6, 2022, issued in European Patent Application No. 19910153.6 (9 pages).
EPO Extended European Search Report dated Aug. 3, 2022, issued in European Patent Application No. 19898125.0 (11 pages).
Chinese Office Action, with English translation, dated Aug. 3, 2022, issued in corresponding Chinese Patent Application No. 201980055198.4 (20 pages).
Ghosh, Prof. Premamoy, "Polymer Science Fundamentals of Polymer Science: Molecular Weights of Polymers," Sep. 2006, XP055608363, 22 pages.
International Search Report for Application No. PCT/KR2019/009085 dated Oct. 30, 2019, 4pp.
International Search Report for Application No. PCT/KR2019/010130 dated Nov. 26, 2019, 4pp.
International Search Report for Application No. PCT/KR2019/010128 dated Nov. 26, 2019, 6pp.
US Office Action dated Nov. 21, 2023, issued in U.S. Appl. No. 17/414,043 (19 pages).
Chinese Office Action, with English translation, dated Apr. 13, 2023, issued in Chinese Patent Application No. 201980083245.6 (6 pages).
Chinese Office Action, with English translation, dated Apr. 23, 2023, issued in Chinese Patent Application No. 201980085835.2 (15 pages).
US Office Action dated Jun. 14, 2023, issued in U.S. Appl. No. 17/296,501 (29 pages).
Chinese Office Action for Chinese Application No. 201980084182.6 dated May 31, 2023, 19 pages.
Chinese Office Action for CN Application No. 201980082244.X dated Sep. 26, 2022, 14 pages.
Chinese Office Action for CN Application No. 201980084182.6 dated Sep. 29, 2022, 16 pages.
Chinese Office Action for CN Application No. 201980085911.X dated Oct. 8, 2022, 21 pages.
Chinese Office Action for CN Application No. 201980087928.9 dated Oct. 9, 2022, 21 pages.
Chinese Office Action, with English translation, dated Apr. 20, 2023, issued in Chinese Patent Application No. CN 201980082244.X (13 pages).
Chinese Office Action, with English translation, dated Apr. 3, 2023, issued in Chinese Patent Application No. 201980087928.9 (28 pages).
Chinese Office Action, with English translation, dated Mar. 8, 2023, issued in Chinese Patent Application No. 201980085911.X (20 pages).
Chinese Office Action, with English translation, dated Jun. 22, 2023, issued in Chinese Patent Application No. 201980087908.1 (23 pages).
Chinese Decision of Rejection, with English translation, dated Jul. 1, 2023, issued in Chinese Patent Application No. 201980085911.X (21 pages).
Chinese Office Action, with English translation, dated Aug. 12, 2023, issued in Chinese Patent Application No. 201980082244.X (13 pages).
EPO Extended European Search Report dated Dec. 20, 2022, issued in European Patent Application No. 19902175.9 (8 pages).
European Search Report for EP 19898811.5 dated Aug. 3, 2022, 11 pages.
European Search Report for EP 19902841.6 dated Aug. 12, 2022, 12 pages.
European Search Report for EP 19906911.3 dated Oct. 14, 2022, 7 pages.
Fedelich, "Application Handbook Thermal Analysis of Polymers Selected Applications Thermal Analysis", Jan. 1, 2013, XP055608279, Retrieved from the Internet: URL: https://www.mt.com/dam/LabDiv/guides-glen/ta-polymer/TA_Polymers_Selected_Apps_EN.pdf [retrieved on Jul. 24, 2019], 40 pgs.
Ghosh, "Polymer Science Fundamentals of Polymer Science Molecular Weights of Polymers Contents Introduction Concept of Average Molecular Weight Number Average Molecular Weight Membrane Osmometry Weight Average Molecular Weight Assessment of Shape of Polymer Molecules Viscosity Average Molecular Weight Gener", Sep. 21, 2006, XP055608363, 22 pgs.
International Search Report for Application No. PCT/KR2019/009945 dated Nov. 20, 2019, 4pp.
International Search Report for Application No. PCT/KR2019/010129 dated Nov. 28, 2019, 4pp.
International Search Report for Application No. PCT/KR2019/010131 dated Nov. 28, 2019, 4 pp.
International Search Report for corresponding Application No. PCT/KR2019/009136 dated Oct. 30, 2019, 4pp.
Limparyoon, Nattawut, et al., "Acrylamide/2-acrylamido-2-methylpropane sulfonic acid and associated sodium salt superabsorbent copolymer nanocomposites with mica as fire retardants", Polymer Degradation and Stability, vol. 96, No. 6, pp. 1054-1063, 2011.
"Derive." New Oxford American Dictionary. Eds. Stevenson, Angus, and Christine A. Lindberg. : Oxford University Press, 2011. Oxford Reference. Date Accessed Aug. 10, 2023, https://www.oxfordreference.com/view/10.1093/acref/9780195392883.001.0001/m_en_us1239627. (Year: 2011).
US Final Office Action dated Aug. 18, 2023, issued in U.S. Appl. No. 17/414,043 (19 pages).
US Final Office Action dated Sep. 25, 2023, issued in U.S. Appl. No. 17/296,501 (26 pages).
US Office Action dated May 2, 2023, issued in U.S. Appl. No. 17/414,043, 19 pages.
EPO Extended European Search Report dated May 17, 2022, issued in corresponding European Patent Application No. 19861770.6 (10 pages).
Notification of Third Party Observation dated Jun. 6, 2022, 15 pages.
Japanese Office Action dated Jun. 20, 2022, issued in corresponding Japanese Patent Application No. 2021-513921 (6 pages).
Chinese Notice of Allowance, with English translation, dated Jan. 13, 2023, issued in corresponding Chinese Patent Application No. 201980055198.4 (8 pages).

(56) References Cited

OTHER PUBLICATIONS

EPO Third Party Observations dated Sep. 21, 2021, issued in corresponding European Patent Application No. 19861770.6 (20 pages).
US Office Action dated Dec. 26, 2023, issued in U.S. Appl. No. 17/296,516 (16 pages).
US Office Action dated Jan. 31, 2024, issued in U.S. Appl. No. 17/296,501 (26 pages).
Final Rejection for U.S. Appl. No. 17/296,501 dated May 14, 2024, 30 pages.
Final Rejection for U.S. Appl. No. 17/296,516 dated May 3, 2024, 14 pages.
US Office Action dated Aug. 6, 2024, issued in U.S. Appl. No. 17/296,501 (30 pages).

\* cited by examiner
† cited by third party

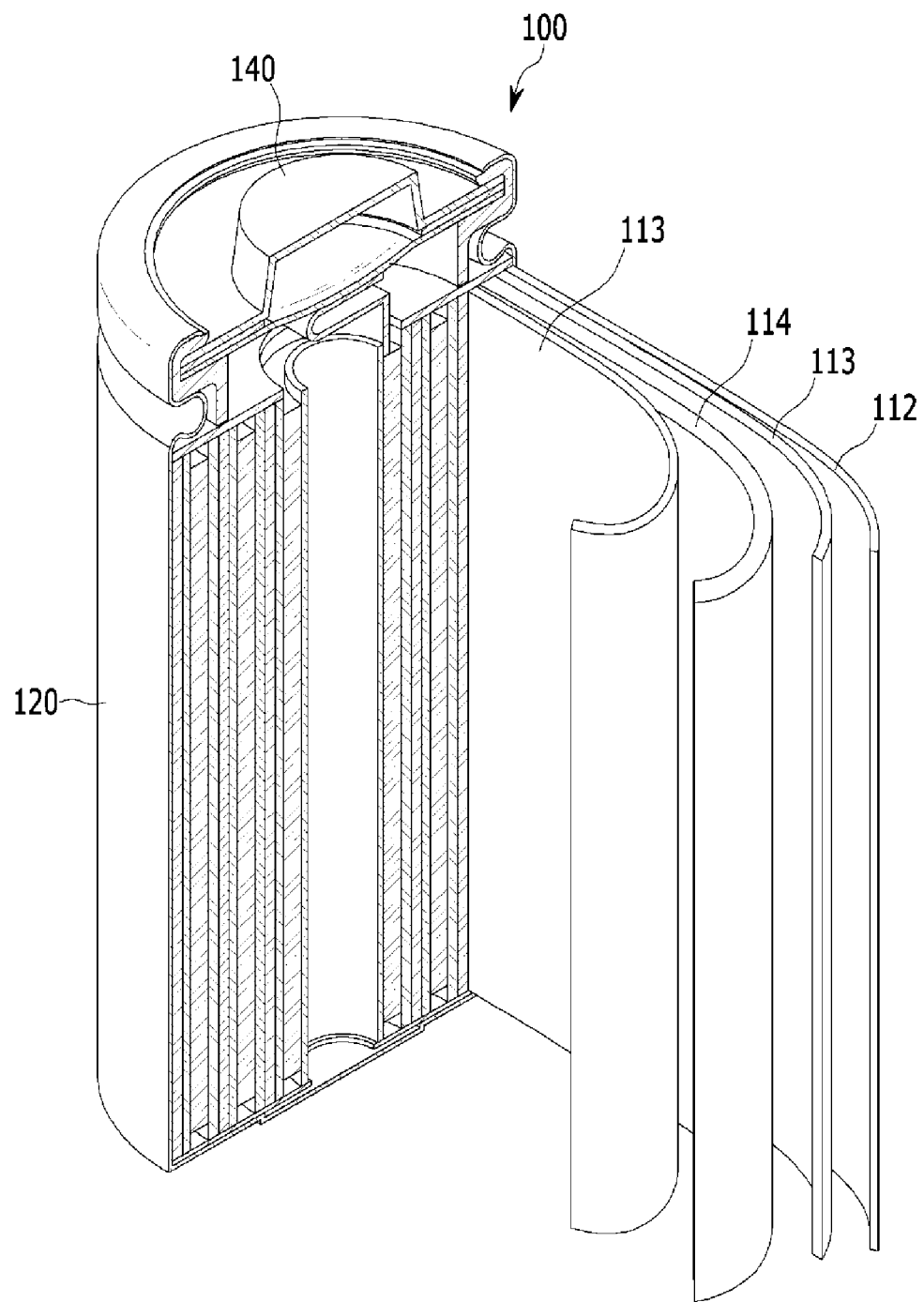

SEPARATOR FOR LITHIUM SECONDARY BATTERY, AND LITHIUM SECONDARY BATTERY INCLUDING SAME

CROSS-REFERENCE TO RELATED APPLICATIONS

This application is a U.S. National Phase Patent Application of International Application Number PCT/KR2019/008767, filed on Jul. 16, 2019, which claims priority to Korean Patent Application Number 10-2018-0111702, filed on Sep. 18, 2018, the entire contents of both of which are incorporated herein by reference.

TECHNICAL FIELD

A separator for a lithium secondary battery and a lithium secondary battery including the same are disclosed.

BACKGROUND ART

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery. In order to overcome this problem, technology of suppressing shrinkage of a separator and ensuring stability of a battery is required.

In this regard, a method of increasing thermal resistance of the separator by mixing inorganic particles having large thermal resistance with an organic binder having adherence and coating them on the separator has been known. However, this conventional method may not sufficiently securing desired adherence and in addition, is difficult to universally apply to separators having various sizes and shapes.

DISCLOSURE

Technical Problem

A separator for a lithium secondary battery having high heat resistance and strong adherence while securing air permeability, and a lithium secondary battery including the same are provided.

Technical Solution

In an embodiment, a separator for a lithium secondary battery includes a porous substrate, and a coating layer on at least one surface of the porous substrate, wherein the coating layer includes an acrylic copolymer including a first structural unit derived from (meth)acrylamide, and a second structural unit including at least one of a structural unit derived from (meth)acrylic acid and (meth)acrylate, and a structural unit derived from (meth)acrylamidosulfonic acid and a salt thereof, the first structural unit is included in an amount of 55 mol % to 95 mol % with respect to 100 mol % of the acrylic copolymer, and the second structural unit is included in an amount of 5 mol % to 45 mol % with respect to 100 mol % of the acrylic copolymer.

Another embodiment provides a lithium secondary battery including a positive electrode, a negative electrode, and the separator for a lithium secondary battery disposed between the positive electrode and the negative electrode.

Advantageous Effects

It is possible to implement a lithium secondary battery including a separator for a lithium secondary battery having improved heat resistance and adherence while stably securing air permeability.

DESCRIPTION OF THE DRAWINGS

FIG. 1 is an exploded perspective view of a lithium secondary battery according to an embodiment.

DESCRIPTION OF SYMBOLS

100: lithium secondary battery
112: negative electrode
113: separator
114: positive electrode
120: battery case
140: sealing member

MODE FOR INVENTION

Hereinafter, embodiments of the present invention are described in detail. However, these embodiments are exemplary, the present invention is not limited thereto and the present invention is defined by the scope of claims.

In the present specification, when a definition is not otherwise provided "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

In the present specification, when a definition is not otherwise provided, the term 'hetero' refers to one including 1 to 3 heteroatoms selected from N, O, S, and P.

A separator for a lithium secondary battery according to an embodiment includes a porous substrate and a coating layer on one surface or both surfaces of the porous substrate.

The porous substrate may have a plurality of pore and may generally be a porous substrate used in an electrochemical device. Non-limiting examples of the porous substrate may be a polymer film formed of a polymer, or a copolymer or a mixture of two or more selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, a polyphenylene oxide, a cyclic olefin copolymer, polyphenylene sulfide, polyethylene naphthalate, a glass fiber, Teflon, and polytetrafluoroethylene.

The porous substrate may be for example a polyolefin-based substrate, and the polyolefin-based substrate may improve has safety of a battery due to its improved shutdown function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate may have a thickness of about 1 μm to 40 μm, for example 1 μm to 30 μm, 1 μm to 20 μm, 5 μm to 15 μm, or 10 μm to 15 μm.

The coating layer according to an embodiment may include an acrylic copolymer including a first structural unit derived from (meth)acrylamide, and a second structural unit including at least one of a structural unit derived from (meth)acrylic acid and (meth)acrylate, and a structural unit derived from (meth)acrylamidosulfonic acid and a salt thereof, the first structural unit may be included in an amount of 55 mol % to 95 mol % with respect to 100 mol % of the acrylic copolymer, and the second structural unit may be included in an amount of 5 mol % to 45 mol % with respect 15 to 100 mol % of the acrylic copolymer.

The first structural unit derived from (meth)acrylamide includes an amide functional group (—NH₂) in the structural unit. The —NH₂ functional group may improve adherence characteristics with a porous substrate and an electrode, forms a hydrogen bond with an —OH functional group of inorganic particles described later and thus more firmly fix the inorganic particles in a coating layer and accordingly, strengthen heat resistance of a separator.

The structural unit derived from (meth)acrylic acid and (meth)acrylate included in the second structural unit may play a role of fixing the inorganic particles on a porous substrate and simultaneously, provide adherence, so that a coating layer may be well adhered to the porous substrate and the electrode and accordingly, contribute to improving heat resistance and air permeability of the separator. In addition, the structural unit derived from (meth)acrylic acid and (meth)acrylate includes a carboxyl functional group (—C(=O)O—) in the structural unit, and the carboxyl functional group may contribute to improvement of the dispersibility of the coating slurry.

In addition, the structural unit derived from (meth)acrylamidosulfonic acid and the salt thereof included in the second structural unit includes a bulky functional group, thereby reducing a mobility of the copolymer including the same, and enhancing heat resistance of the separator.

In an embodiment, the first structural unit may be included in an amount of 75 mol % to 95 mol %, for example 80 mol % to 95 mol % with respect to 100 mol % of the acrylic copolymer.

Meanwhile, the structural unit derived from (meth)acrylic acid and (meth)acrylate among the second structural units may be included in an amount of 0 to 40 mol % with respect to 100 mol % of the acrylic copolymer, and the structural unit derived from (meth)acrylamidosulfonic acid and the salt thereof may be included in an amount of 0 to 10 mol % with respect to 100 mol % of the acrylic copolymer.

For example, the structural unit derived from (meth) acrylamide may be included in an amount of 90 mol % to 95 mol % with respect to 100 mol % of the acrylic copolymer, the structural unit derived from (meth)acrylic acid and (meth)acrylate may be included in an amount of 0 mol % to 5 mol % with respect to 100 mol % of the acrylic copolymer, and the structural unit derived from (meth)acrylamidosulfonic acid and the salt thereof may be included in an amount of 0 mol % to 5 mol % with respect to 100 mol % of the acrylic copolymer.

When the amounts of each structural unit are within the ranges, heat resistance and adherence of the separator may be further improved.

The first structural unit derived from (meth)acrylamide may be for example represented by Chemical Formula 1.

[Chemical Formula 1]

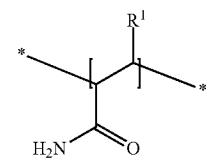

In Chemical Formula 1, $R^1$ is hydrogen or a C1 to C6 alkyl group.

The structural unit derived from (meth)acrylic acid and (meth)acrylate may be for example represented by one of Chemical Formula 2, Chemical Formula 3, and a combination thereof.

[Chemical Formula 2]

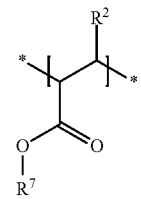

[Chemical Formula 3]

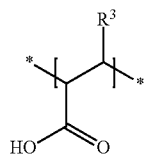

In Chemical Formula 2 and Chemical Formula 3, $R^2$ and $R^3$ are independently hydrogen or a C1 to C6 alkyl group, and $R^7$ is a substituted or unsubstituted C1 to C20 alkyl group.

The structural unit derived from the (meth)acrylate may be derived from (meth)acrylic acid alkyl ester, (meth)acrylic acid perfluoroalkyl ester, and (meth)acrylate having a functional group at the side chain, for example (meth)acrylic acid alkyl ester. In addition, the carbon number of an alkyl group or a perfluoroalkyl group bound to the non-carbonyl oxygen atom of the (meth)acrylic acid alkyl ester or (meth)acrylic acid perfluoroalkyl ester may be specifically 1 to 20, more specifically 1 to 10, for example 1 to 5.

Specific examples of the (meth)acrylic acid alkyl ester in which the carbon number of an alkyl group or a perfluoroalkyl group bound to the non-carbonyl oxygen atom is 1 to 5 may be acrylic acid alkyl ester such as methyl acrylate, ethyl acrylate, n-propyl acrylate, isopropyl acrylate, n-butyl acrylate, and t-butyl acrylate, and the like; 2-(perfluoroalkyl) ethyl acrylate such as 2-(perfluorobutyl) ethyl acrylate, 2-(perfluoropentyl) ethyl acrylate, and the like; methacrylic acid alkyl ester such as methyl methacrylate, ethyl methacrylate, n-propyl methacrylate, isopropyl methacrylate, n-butyl methacrylate, and t-butyl methacrylate, and the like;

and 2-(perfluoroalkyl) ethyl methacrylate such as 2-(perfluorobutyl) ethyl methacrylate, 2-(perfluoropentyl) ethyl methacrylate, 2-(perfluoroalkyl) ethyl methacrylate, and the like.

Other (meth)acrylic acid alkyl ester may be acrylic acid alkyl ester in which the carbon number of the alkyl group bound to the non-carbonyl oxygen atom is 6 to 18 such as n-hexyl acrylate, 2-ethylhexyl acrylate, nonyl acrylate, lauryl acrylate, stearyl acrylate, cyclohexyl acrylate, and isobornyl acrylate, and the like; methacrylic acid alkyl ester in which the carbon number of the alkyl group bound to the non-carbonyl oxygen atom is 6 to 18 such as n-hexyl methacrylate, 2-ethylhexyl methacrylate, octyl methacrylate, isodecyl methacrylate, lauryl methacrylate, tridecyl methacrylate, stearyl methacrylate, and cyclohexyl methacrylate; 2-(perfluoroalkyl) ethyl acrylate in which the carbon number of the perfluoroalkyl group bound to the non-carbonyl oxygen atom such as 2-(perfluorohexyl)ethyl acrylate, 2-(perfluorooctyl) ethyl acrylate, 2-(perfluorononyl) ethyl acrylate, 2-(perfluorodecyl) ethyl acrylate, 2-(perfluorododecyl) ethyl acrylate, 2-(perfluorotetradecyl) ethyl acrylate, 2-(perfluorohexadecyl) ethyl acrylate, and the like; 2-(perfluoroalkyl) ethyl methacrylate in which the carbon number of the perfluoroalkyl group bound to the non-carbonyl oxygen atom is 6 to 18 such as 2-(perfluorohexyl) ethyl methacrylate, 2-(perfluorooctyl) ethyl methacrylate, 2-(perfluorononyl) ethyl methacrylate, 2-(perfluorodecyl) ethyl methacrylate, 2-(perfluorododecyl) ethyl methacrylate, 2-(perfluorotetradecyl) ethyl methacrylate, 2-(perfluorohexadecyl) ethyl methacrylate, and the like.

For example, the structural unit derived from (meth)acrylic acid or (meth)acrylate includes a structural unit represented by Chemical Formula 2 and a structural unit represented by Chemical Formula 3 respectively or both of them together, and when the structural units are included together, the structural units represented by Chemical Formulas 2 and 3 may be included in a mole ratio of 10:1 to 1:1, desirably 6:1 to 1:1, and more desirably 3:1 to 1:1.

The structural unit derived from (meth)acrylamidosulfonic acid and the salt thereof may be a structural unit derived from (meth)acrylamidosulfonic acid or (meth)acrylamidosulfonate, and the (meth)acrylamidosulfonate may be a conjugate base of (meth)acrylamidosulfonic acid, (meth)acrylamidosulfonate, or a derivative thereof. The structural unit derived from (meth)acrylamidosulfonic acid or (meth)acrylamidosulfonate may be, for example, represented by one of Chemical Formula 4, Chemical Formula 5, Chemical Formula 6, and a combination thereof.

[Chemical Formula 4]

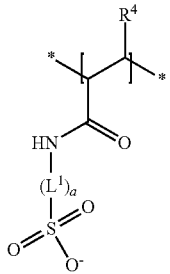

[Chemical Formula 5]

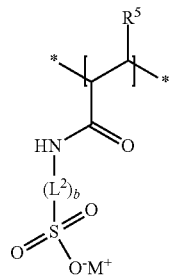

[Chemical Formula 6]

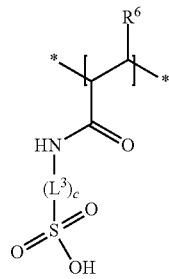

In Chemical Formula 4 to Chemical Formula 6, $R^4$, $R^5$, and $R^6$ are independently hydrogen or a C1 to C6 alkyl group, $L^1$, $L^2$, and $L^3$ are independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, a, b, and c are independently an integer of 0 to 2, and M is an alkali metal, and the alkali metal may be for example lithium, sodium, potassium, rubidium, or cesium.

For example, in Chemical Formula 4 to Chemical Formula 6, $L^1$, $L^2$, and $L^3$ may independently be a substituted or unsubstituted C1 to C10 alkylene group, and each a, b, and c may be 1.

The structural unit derived from (meth)acrylamidosulfonic acid and a salt thereof may include each of the structural unit represented by Chemical Formula 5, the structural unit represented by Chemical Formula 5, and the structural unit represented by Chemical Formula 6, or two or more thereof. For example, the structural unit represented by Chemical Formula 5 may be included. For another example, the structural unit represented by Chemical Formula 5 and the structural unit represented by Chemical Formula 6 may be included.

When the structural unit represented by Chemical Formula 5 and the structural unit represented by Chemical Formula 6 are included together, the structural unit represented by Chemical Formula 5 and the structural unit represented by Chemical Formula 6 may be included in a mole ratio of 10:1 to 1:2, desirably 5:1 to 1:1, and more desirably 3:1 to 1:1.

The sulfonate group in the structural unit derived from (meth)acrylamidosulfonic acid and the salt thereof may be for example a functional group derived from vinyl sulfonic acid, allyl sulfonic acid, styrene sulfonic acid, anethole sulfonic acid, acrylamidoalkane sulfonic acid, sulfoalkyl (meth)acrylate, or a salt thereof.

Herein, the alkane may be C1 to C20 alkane, C1 to C10 alkane, or C1 to C6 alkane and the alkyl may be C1 to C20 alkyl, C1 to C10 alkyl, or C1 to C6 alkyl. The salt refers to a salt consisting of the sulfonic acid and an appropriate ion.

The ion may be for example an alkali metal ion and in this case, the salt may be an alkali metal sulfonate salt.

The acryl amidoalkane sulfonic acid may be for example 2-acrylamido-2-methylpropane sulfonic acid and the sulfoalkyl (meth)acrylate may be for example 2-sulfoethyl (meth)acrylate, 3-sulfopropyl (meth)acrylate, and the like.

The acrylic copolymer may be for example represented by Chemical Formula 7.

[Chemical Formula 7]

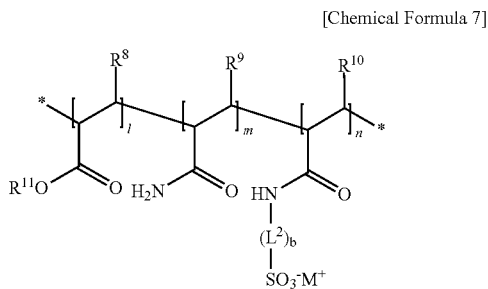

In Chemical Formula 7, $R^8$ to $R^{10}$ are independently hydrogen or a methyl group, $R^{11}$ is hydrogen or a C1 to C6 alkyl group, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, b is one of integers of 0 to 2, M is an alkali metal such as lithium, sodium, potassium, rubidium, or cesium, and the like, and l, m, and n indicates a mole ratio of each unit.

For example, in Chemical Formula 7, l+m+n may be 1. In addition, for example, l, m, and n may be in the range: $0.05 \leq (l+n) \leq 0.45$, $0.55 \leq m \leq 0.95$, specifically $0 \leq l \leq 0.4$, and $0 \leq n \leq 0.1$, for example $0.9 \leq m \leq 0.95$, $0 \leq l \leq 0.05$, and $0 \leq n \leq 0.05$.

For example, in Chemical Formula 7, $L^2$ may be a substituted or unsubstituted C1 to C10 alkylene group and b may be 1.

The substitution degree of the alkali metal ($M^+$) in the acrylic copolymer may be 0.5 to 1.0, for example, 0.6 to 0.9 or 0.7 to 0.9 with respect to a mole ratio of the (meth)acrylamidosulfonic acid structural unit, that is, n. When the substitution degree of the alkali metal satisfies the ranges, the acrylic copolymer and the separator including the same may exhibit improved adherence, heat resistance, and oxidation resistance.

The acrylic copolymer may further include other units in addition to the units. For example the acrylic copolymer may further include a unit derived from alkyl(meth)acrylate, a unit derived from a diene-based monomer, a unit derived from a styrene-based monomer, an ester group-containing unit, a carbonate group-containing unit, or a combination thereof.

The acrylic copolymer may have various forms, that is, an alternate polymer where the units are alternately distributed, a random polymer the units are randomly distributed, or a graft polymer where a part of structural unit is grafted.

A weight average molecular weight of the acrylic copolymer may be 350,000 to 970,000, for example 450,000 to 970,000, or 450,000 to 700,000. When the weight average molecular weight of the acrylic copolymer satisfies the ranges, the acrylic copolymer and the separator including the same may exhibit excellent adherence, heat resistance, and air permeability. The weight average molecular weight may be polystyrene-reduced average molecular weight measured by gel permeation chromatography.

The acrylic copolymer may be prepared by various methods such as emulsion polymerization, suspension polymerization, massive polymerization, solution polymerization, or bulk polymerization.

The coating layer may further include inorganic particles together with the acrylic copolymer.

In the coating layer, the acrylic copolymer: inorganic particles may be included in a weight ratio of 1:20 to 1:40, desirably 1:25 to 1:40, more desirably 1:25 to 1:35. When the acrylic copolymer and the inorganic particles are included within the above range in the coating layer, the separator may exhibit improved heat resistance and air permeability.

Since the coating layer includes the inorganic particles, heat resistance is improved, and the separator may be prevented from being rapidly contracted or deformed due to an increase of a temperature. The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. The inorganic particles may be spherical, plate-shaped, cubic, or amorphous. The inorganic particles may have an average particle diameter of about 1 nm to 2500 nm, within the range, 100 nm to 2000 nm, or 200 nm to 1000 nm, for example about 300 nm to 800 nm. The average particle diameter of the inorganic particles may be a particle size ($D_{50}$) at 50% by volume in a cumulative size-distribution curve. By using inorganic particles having the average particle diameter within the above ranges, appropriate strength may be imparted to the coating layer, thereby improving heat resistance, durability, and stability of the separator.

The inorganic particles may be included in an amount of 50 wt % to 99 wt % based on the coating layer. In an embodiment, the inorganic particles may be included in an amount of 70 wt % to 99 wt %, for example 80 wt % to 99 wt %, 85 wt % to 99 wt %, 90 wt % to 99 wt %, or 95 wt % to 99 wt % based on the coating layer. When the inorganic particles are included within the above range, the separator for a lithium secondary battery according to an embodiment may exhibit improved heat resistance, durability, and stability.

Meanwhile, the coating layer may further include a crosslinked binder having a crosslinked structure in addition to the acrylic copolymer. The crosslinked binder may be obtained from a monomer, an oligomer, and/or a polymer having a curable functional group capable of reacting with heat and/or light, for example, a multi-functional monomer, a multi-functional oligomer, and/or a multi-functional polymer having at least two curable functional groups. The curable functional group may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof, but is not limited thereto.

The crosslinked binder may be obtained from a monomer, an oligomer and/or a polymer including at least two (meth)acrylate groups, for example ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth) acrylate, trimethylolpropane tri(meth)acrylate, glycerine tri(meth)acrylate, pentaerythritol tetra(meth)acrylate, diglycerine hexa(meth)acrylate, or a combination thereof.

For example, the crosslinked binder may be obtained from a monomer, an oligomer and/or a polymer including at least two epoxy groups, for example bisphenol A diglycidyl ether, bisphenol F diglycidyl ether, hexahydrophthalic acid glycidyl ester, or a combination thereof.

For example, the crosslinked binder may be obtained from a monomer, an oligomer and/or a polymer including at least two isocyanate groups, for example diphenylmethane diisocyanate, 1,6-hexamethylene diisocyanate, 2,2,4(2,2,4)-trimethyl hexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, or a combination thereof.

In addition, the coating layer may further include a non-crosslinked binder in addition to the acrylic copolymer. The non-crosslinked binder may be for example a vinylidene fluoride-based polymer, polymethylmethacrylate, polyacrylonitrile, polyvinylpyrrolidone, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, an acrylonitrile-styrene-butadiene copolymer, or a combination thereof, but is not limited thereto.

The vinylidene fluoride-based polymer may be specifically a homopolymer including only vinylidene fluoride monomer-derived unit or a copolymer of a vinylidene fluoride-derived unit and other monomer-derived unit. The copolymer may specifically include a vinylidene fluoride-derived unit and at least one of units derived from chlorotrifluoroethylene, trifluoroethylene, hexafluoropropylene, ethylene tetrafluoride and ethylene monomers, but is not limited thereto. For example, the copolymer may be a polyvinylidene fluoride-hexafluoropropylene (PVdF-HFP) copolymer including a vinylidene fluoride monomer-derived unit and a hexafluoropropylene monomer-derived unit.

For example, the non-crosslinked binder may be a polyvinylidene fluoride (PVdF) homopolymer, a polyvinylidene fluoride-hexafluoropropylene (PVdF-HFP) copolymer, or a combination thereof. In this case, the adherence between the porous substrate and the coating layer is improved, stability of the separator and impregnating property of the electrolyte are improved, and thus high-rate charge/discharge characteristics of the battery may be improved.

The coating layer may have a thickness of about 1 μm to 5 μm, for example, 1.5 μm to 3 μm.

A thickness ratio of the coating layer to the porous substrate may be 0.05 to 0.5, for example, 0.05 to 0.4, or 0.05 to 0.3, or 0.1 to 0.2. In this case, the separator including the porous substrate and the coating layer may exhibit improved air permeability, heat resistance, and adherence.

The separator for a lithium secondary battery according to an embodiment has improved heat resistance. Specifically, the separator may have a shrinkage rate of less than 10% or less than 5% at high temperature. For example, after the separator is left at 150° C. for 60 minutes, the shrinkage rates in the longitudinal direction and the transverse direction of the separator may be less than or equal to 5%, or less than or equal to 10%, respectively.

The separator for a lithium secondary battery according to an embodiment may exhibit improved and may have air permeability per unit thickness of less than 160 sec/100 cc·1 μm, for example, less than 150 sec/100 cc·1 μm, or less than 140 sec/100 cc·1 μm. Here, the air permeability refers to a time (seconds) until the separator permeates 100 cc of air the unit through the thickness of the separator. The air permeability per unit thickness may be obtained by measuring the air permeability for the total thickness of the separator and then dividing it by the thickness.

The separator for a lithium secondary battery according to an embodiment may be manufactured by known various methods. For example, the separator for a lithium secondary battery may be formed by coating a composition for forming a coating layer and drying the same on one surface or both surfaces of the porous substrate.

The composition for forming a coating layer may include the acrylic copolymer, inorganic particles, and solvent. The solvent is not particularly limited if the solvent may dissolve or disperse the acrylic copolymer and the inorganic particles. In an embodiment, the solvent may be an aqueous solvent including water, an alcohol, or a combination thereof, which is environmentally-friendly.

The coating may be, for example a spin coating, a dip coating, a bar coating, a die coating, a slit coating, a roll coating, an inkjet printing, and the like, but is not limited thereto.

The drying may be for example performed through natural drying, drying with warm air, hot air, or low humid air, vacuum-drying, or irradiation of a far-infrared ray, an electron beam, and the like, but the present disclosure is not limited thereto. The drying may be for example performed at a temperature of 25° C. to 120° C.

The separator for a lithium secondary battery may be manufactured by lamination, coextrusion, and the like in addition to the above method.

Hereinafter, a lithium secondary battery including the aforementioned separator for the lithium secondary battery is described.

A lithium secondary battery may be classified into a lithium ion battery, a lithium ion polymer battery, and a lithium polymer battery depending on types of a separator and an electrolyte, it also may be classified to be cylindrical, prismatic, coin-type, pouch-type, and the like depending on shapes and in addition, it may be bulk type and thin film type depending on sizes. Structures and manufacturing methods for these batteries pertaining to this disclosure are well known in the art.

Herein, as an example of a lithium secondary battery, a cylindrical lithium secondary battery is for example described. FIG. 1 is an exploded perspective view of a lithium secondary battery according to an embodiment. Referring to FIG. 1, a lithium secondary battery 100 according to an embodiment includes a battery cell including a negative electrode 112, a positive electrode 114 facing the negative electrode 112, a separator 113 disposed between the negative electrode 112 and the positive electrode 114, and an electrolyte solution (not shown) immersed in the negative electrode 112, positive electrode 114 and separator 113, a battery case 120 housing the battery cell, and a sealing member 140 sealing the battery case 120.

The positive electrode 114 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound capable of intercalating and deintercalating lithium. Specifically, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 112 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ ($0<x<2$), a Si—C composite, a Si—Y alloy, Sn, $SnO_2$, a Sn—C composite, a Sn—Y alloy, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof. The transition metal oxide may be vanadium oxide, lithium vanadium oxide, and the like.

The binder and the conductive material used in the negative electrode 112 may be the same as the binder and conductive material of the aforementioned positive electrode 114.

The positive electrode 114 and the negative electrode 112 may be manufactured by mixing each active material composition including each active material and a binder, and optionally a conductive material in a solvent, and coating the active material composition on each current collector.

Herein, the solvent may be N-methylpyrrolidone, and the like, but is not limited thereto. The electrode manufacturing method is well known, and thus is not described in detail in the present specification.

The electrolyte solution includes an organic solvent a lithium salt.

The organic solvent serves as a medium for transmitting ions taking part in the electrochemical reaction of a battery. The organic solvent may be a carbonate-based solvent, an ester-based solvent, an ether-based solvent, a ketone-based solvent, an alcohol-based solvent, and an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof, but are not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

DETAILED DESCRIPTION OF THE EMBODIMENTS

Hereinafter, the above aspects of the present disclosure are illustrated in more detail with reference to examples. However, these examples are exemplary, and the present disclosure is not limited thereto.

SYNTHESIS EXAMPLES: PREPARATION OF ACRYLIC COPOLYMER

Synthesis Example 1: AA/AM/AMPS=0/95/5, Molecular Weight: 350000

Distilled water (6361 g), acrylamide (675.3 g, 9.5 mol), potassium persulfate (2.7 g, 0.01 mol), 2-acrylamido-2-methylpropanesulfonic acid (103.6 g, 0.5 mol), and a 5 N lithium hydroxide aqueous solution (1.05 equivalent based on a total amount of the 2-acrylamido-2-methylpropane sulfonic acid) were put in a 10 L four-necked flask equipped with a stirrer, a thermometer, and a condenser, and an internal pressure of the flask was reduced to 10 mmHg with a diaphragm pump and then, recovered to a normal pressure with nitrogen, which was three times repeated.

The reaction solution was controlled to be stable between 65° C. to 70° C. for 12 hours. The reaction solution was cooled down to room temperature and adjusted to have pH in a range of 7 to 8 by using a 25% ammonia aqueous solution.

In this method, a poly(acrylic acid-co-acrylamide-co-2-acrylamido-2-methylpropanesulfonic acid)sodium salt was prepared. The mole ratio of the acrylic acid, acrylamide, and 2-acrylamido-2-methylpropanesulfonic acid was 0:95:5. When a non-volatile component was measured by taking about 10 mL of the reaction solution (a reaction product), the result was 9.5% (a theoretical value: 10%).

Synthesis Example 2: AA/AM/AMPS=0/95/5, Molecular Weight: 450000

Distilled water (6361 g), acrylamide (675.3 g, 9.5 mol), potassium persulfate (2.7 g, 0.01 mol), 2-acrylamido-2-methylpropanesulfonic acid (103.6 g, 0.5 mol), and a 5 N lithium hydroxide aqueous solution (1.05 equivalent based on a total amount of 2-acrylamido-2-methylpropanesulfonic acid) were put in a 10 L four-necked flask equipped with a stirrer, a thermometer, and a condenser, and then, the internal pressure was reduced into 10 mmHg and then, returned to the normal pressure, which was three times repeated.

The reaction solution was reacted for 12 hours, while controlled to be stable within the temperature range of 65° C. to 70° C., and after secondarily adding ammonium persulfate (0.23 g, 1.00 mmol, 630 ppm based on monomers) thereto, the obtained mixture was heated up to 75° C. and reacted for 4 hours more. The reaction solution was cooled down to room temperature and adjusted to have pH in a range of 7 to 8 by using a 25% ammonia aqueous solution.

In this method, a poly(acrylic acid-co-acrylamide-co-2-acrylamido-2-methylpropanesulfonic acid)sodium salt was prepared. The mole ratio of the acrylic acid, acrylamide, and 2-acrylamido-2-methylpropanesulfonic acid was 0:95:5. When a non-volatile component was measured by taking about 10 mL of the reaction solution (a reaction product), the result was 9.5% (theoretical value: 10%).

Synthesis Example 3: AA/AM/AMPS=0/95/5, Molecular Weight: 650000

Distilled water (6361 g), acrylamide (675.3 g, 9.5 mol), potassium persulfate (2.7 g, 0.01 mol), 2-acrylamido-2-methylpropanesulfonic acid (103.6 g, 0.5 mol), and a 5 N lithium hydroxide aqueous solution (1.05 equivalent based on a total amount of 2-acrylamido-2-methylpropanesulfonic acid) were put in a 10 L four-necked flask equipped with a stirrer, a thermometer, and a condenser, and then, the internal pressure was reduced into 10 mmHg and then, returned to the normal pressure, which was three times repeated.

The reaction solution was reacted for 18 hours, while controlled to be stable within the temperature range of 65° C. to 70° C., and after secondarily adding ammonium persulfate (0.23 g, 1.00 mmol, 630 ppm based on monomers) thereto, the obtained mixture was heated up to 80° C. and reacted for 4 hours more. The reaction solution was cooled down to room temperature and adjusted to have pH in a range of 7 to 8 by using a 25% ammonia aqueous solution.

In this method, poly(acrylic acid-co-acrylamide-co-2-acrylamido-2-methylpropanesulfonic acid)sodium salt was prepared. The mole ratio of the acrylic acid, acrylamide, and 2-acrylamido-2-methylpropanesulfonic acid was 0:95:5. When a non-volatile component was measured by taking about 10 mL of the reaction solution (a reaction product), the result was 9.5% (theoretical value: 10%).

Synthesis Example 4: AA/AM/AMPS=0/95/5, Molecular Weight: 900000

Distilled water (6361 g), acrylamide (675.3 g, 9.5 mol), potassium persulfate (1.35 g, 0.005 mol), 2-acrylamido-2-methylpropanesulfonic acid (103.6 g, 0.5 mol), and a 5 N lithium hydroxide aqueous solution (1.05 equivalent based on a total amount of 2-acrylamido-2-methylpropanesulfonic acid) were put in a 10 L four-necked flask equipped with a stirrer, a thermometer, and a condenser, and then, the internal pressure was reduced into 10 mmHg and then, returned to the normal pressure, which was three times repeated.

The reaction solution was reacted for 18 hours, while controlled to be stable within the temperature range of 65° C. to 70° C., and after secondarily adding ammonium persulfate (0.23 g, 1.00 mmol, 630 ppm based on a monomer) thereto, the obtained mixture was increased up to 80° C. and reacted for 4 hours more. The reaction solution was cooled down to room temperature and adjusted to have pH in a range of 7 to 8 by using a 25% ammonia aqueous solution.

In this method, a poly(acrylic acid-co-acrylamide-co-2-acrylamido-2-methylpropanesulfonic acid)sodium salt was prepared. The mole ratio of the acrylic acid, acrylamide, and 2-acrylamido-2-methylpropanesulfonic acid was 0:95:5. When a non-volatile component was measured by taking about 10 mL of the reaction solution (a reaction product), the result was 9.5% (a theoretical value: 10%).

Synthesis Example 5: AA/AM/AMPS=0/95/5, Molecular Weight: 200000

Distilled water (6361 g), acrylamide (675.3 g, 9.5 mol), potassium persulfate (3.24 g, 0.012 mol), 2-acrylamido-2-methylpropanesulfonic acid (103.6 g, 0.5 mol) and a 5 N lithium hydroxide aqueous solution (1.05 equivalent based on a total amount of 2-acrylamido-2-methylpropanesulfonic acid) were put in a 10 L four-necked flask equipped with a stirrer, a thermometer, and a condenser, and then, the internal pressure was reduced into 10 mmHg and then, returned to the normal pressure, which was three times repeated.

The reaction solution was reacted for 18 hours, while controlled to be stable within the temperature range of 65° C. to 70° C., and after secondarily adding ammonium persulfate (0.23 g, 1.00 mmol, 630 ppm based on monomers) thereto, the obtained mixture was heated up to 75° C. and reacted for 4 hours more. The reaction solution was cooled down to room temperature and adjusted to have pH in a range of 7 to 8 by using a 25% ammonia aqueous solution.

In this method, poly(acrylic acid-co-acrylamide-co-2-acrylamido-2-methylpropanesulfonic acid)sodium salt was prepared. The mole ratio of the acrylic acid, acrylamide, and 2-acrylamido-2-methylpropanesulfonic acid was 0:95:5. When a non-volatile component was measured by taking about 10 mL of the reaction solution (a reaction product), the result was 9.5% (a theoretical value: 10%).

Synthesis Example 6: AA/AM/AMPS=0/95/5, Molecular Weight: 300000

Distilled water (6361 g), acrylamide (675.3 g, 9.5 mol), potassium persulfate (2.7 g, 0.01 mol), 2-acrylamido-2-methylpropanesulfonic acid (103.6 g, 0.5 mol), and a 5 N lithium hydroxide aqueous solution (1.05 equivalent based on a total amount of 2-acrylamido-2-methylpropanesulfonic acid) were put in a 10 L four-necked flask equipped with a stirrer, a thermometer, and a condenser, and then, the internal pressure was reduced into 10 mmHg and then, returned to the normal pressure, which was three times repeated.

The reaction solution was controlled to be stable between 65° C. to 70° C. for 10 hours. The reaction solution was cooled down to room temperature and adjusted to have pH in a range of 7 to 8 by using a 25% ammonia aqueous solution.

In this method, a poly(acrylic acid-co-acrylamide-co-2-acrylamido-2-methylpropanesulfonic acid)sodium salt was prepared. The mole ratio of the acrylic acid, acrylamide, and 2-acrylamido-2-methylpropanesulfonic acid was 0:95:5. When a non-volatile component was measured by taking about 10 mL of the reaction solution (a reaction product), the result was 9.5% (a theoretical value: 10%).

Synthesis Example 7: AA/AM/AMPS=20/75/5, Molecular Weight: 550000

A acrylic copolymer was manufactured according to the same method as Synthesis Example 3 except that acrylic acid (144.1 g, 2.0 mol), acrylamide (533.1 g, 7.5 mol), and 2-acrylamido-2-methylpropanesulfonic acid (103.6 g, 0.5 mol) were used. The mole ratio of the acrylic acid, acrylamide, and 2-acrylamido-2-methylpropanesulfonic acid was 20:75:5. A non-volatile component of the reaction solution was 9.5% (theoretical value: 10%).

Synthesis Example 8: AA/AM/AMPS=40/55/5, Molecular Weight: 750000

A acrylic copolymer was manufactured according to the same method as Synthesis Example 3 except that acrylic acid (288.2 g, 4.0 mol), acrylamide (390.9 g, 5.5 mol), and 2-acrylamido-2-methylpropanesulfonic acid (103.6 g, 0.5 mol) were used. The mole ratio of the acrylic acid, acrylamide, and 2-acrylamido-2-methylpropanesulfonic acid was 40:55:5. A non-volatile component of the reaction solution was 9.5% (theoretical value: 10%).

Synthesis Example 9: AA/AM/AMPS=20/80/0, Molecular Weight: 500000

A acrylic copolymer was manufactured according to the same method as Synthesis Example 3 except that acrylic acid (144.1 g, 2.0 mol) and acrylamide (568.64 g, 8.0 mol) were used. The mole ratio of the acrylic acid, acrylamide, and 2-acrylamido-2-methylpropanesulfonic acid was 20:80:0. A non-volatile component of the reaction solution was 9.5% (theoretical value: 10%).

Synthesis Example 10: AA/AM/AMPS=10/80/10, Molecular Weight: 400000

A acrylic copolymer was manufactured according to the same method as Synthesis Example 3 except that acrylic acid (72.1 g, 1.0 mol), acrylamide (568.6 g, 8.0 mol), and 2-acrylamido-2-methylpropanesulfonic acid (207.24 g, 1.0 mol) were used. The mole ratio of the acrylic acid, acrylamide, and 2-acrylamido-2-methylpropanesulfonic acid was 10:80:10. A non-volatile component of the reaction solution was 9.5% (theoretical value: 10%).

Synthesis Example 11: AA/AM/AMPS=100/0/0, Molecular Weight: 300000

A acrylic copolymer was manufactured according to the same method as Synthesis Example 3 except that acrylic acid (720.6 g, 10.0 mol) was used, but 2-acrylamido-2-methylpropanesulfonic acid and acrylamide were not used. A non-volatile component of the reaction solution was 9.0% (theoretical value: 10%).

Synthesis Example 12: AA/AM/AMPS=0/0/100, Molecular Weight: 300000

A acrylic copolymer was manufactured according to the same method as Synthesis Example 3 except that 2-acrylamido-2-methylpropanesulfonic acid (2072.4 g, 10.0 mol) was used, but acrylic acid and acrylamide were not used. A non-volatile component of the reaction solution was 9.0% (theoretical value: 10%).

TABLE 1

| | Mole ratio of monomers | | | Weight average molecular weight |
|---|---|---|---|---|
| | AA | AM | AMPS | (g/mol) |
| Synthesis Example 1 | 0 | 95 | 5 | 350,000 |
| Synthesis Example 2 | 0 | 95 | 5 | 450,000 |
| Synthesis Example 3 | 0 | 95 | 5 | 650,000 |
| Synthesis Example 4 | 0 | 95 | 5 | 900,000 |
| Synthesis Example 5 | 0 | 95 | 5 | 200,000 |
| Synthesis Example 6 | 0 | 95 | 5 | 300,000 |
| Synthesis Example 7 | 20 | 75 | 5 | 550,000 |
| Synthesis Example 8 | 40 | 55 | 5 | 750,000 |
| Synthesis Example 9 | 20 | 80 | 0 | 500,000 |
| Synthesis Example 10 | 10 | 80 | 10 | 400,000 |
| Synthesis Example 11 | 100 | 0 | 0 | 300,000 |
| Synthesis Example 12 | 0 | 0 | 100 | 300,000 |

In Table 1, AA is acrylic acid, AM is acrylamide, and AMPS is 2-acrylamido-2-methylpropanesulfonic acid.

EXAMPLE: PREPARATION OF SEPARATOR FOR LITHIUM SECONDARY BATTERY

Example 1

A composition for forming a coating layer was prepared by mixing water and a dispersing agent with inorganic ceramic (boehmite (0.65 μm)) and then, pre-dispersing them for 1 hour and milling them for 30 minutes to prepare dispersion, adding the acrylic copolymer (10 wt % in distilled water) of Synthesis Example 1 to the dispersion in a weight ratio of acrylic copolymer:inorganic ceramic=1:28 to have 25 wt % of the total solid content. This composition was coated to be 2 μm thick on the cross section of an 8 μm-thick polyethylene porous substrate (air permeability: 120 sec/100 cc, puncture strength: 480 kgf, SK) in a bar-coating method and then, dried at 60° C. for 10 minutes to manufacture a separator for a secondary battery cell.

Example 2-1

A separator for a secondary battery cell was manufactured according to the same method as Example 1 except that the acrylic copolymer of Synthesis Example 7 was used instead of the acrylic copolymer according to Synthesis Example 1.

Example 2-2

A separator for a secondary battery cell was manufactured according to the same method as Example 1 except that the acrylic copolymer of Synthesis Example 8 was used instead of the acrylic copolymer according to Synthesis Example 1.

Example 2-3

A separator for a secondary battery cell was manufactured according to the same method as Example 1 except that the acrylic copolymer of Synthesis Example 9 was used instead of the acrylic copolymer according to Synthesis Example 1.

Example 2-4

A separator for a secondary battery cell was manufactured according to the same method as Example 1 except that the acrylic copolymer of Synthesis Example 10 was used instead of the acrylic copolymer according to Synthesis Example 1.

Comparative Example 2-1

A separator for a secondary battery cell was manufactured according to the same method as Example 1 except that the acrylic copolymer of Synthesis Example 11 was used instead of the acrylic copolymer according to Synthesis Example 1.

Comparative Example 2-2

A separator for a secondary battery cell was manufactured according to the same method as Example 1 except that the acrylic copolymer of Synthesis Example 12 was used instead of the acrylic copolymer according to Synthesis Example 1.

Example 3-1

A separator for a secondary battery cell was manufactured according to the same method as Example 1 except that the acrylic copolymer of Synthesis Example 2 was used instead of the acrylic copolymer according to Synthesis Example 1.

Example 3-2

A separator for a secondary battery cell was manufactured according to the same method as Example 1 except that the acrylic copolymer of Synthesis Example 3 was used instead of the acrylic copolymer according to Synthesis Example 1.

Example 3-3

A separator for a secondary battery cell was manufactured according to the same method as Example 1 except that the acrylic copolymer of Synthesis Example 4 was used instead of the acrylic copolymer according to Synthesis Example 1.

Comparative Example 3-1

A separator for a secondary battery cell was manufactured according to the same method as Example 1 except that the acrylic copolymer of Synthesis Example 5 was used instead of the acrylic copolymer according to Synthesis Example 1.

Comparative Example 3-2

A separator for a secondary battery cell was manufactured according to the same method as Example 1 except that the acrylic copolymer of Synthesis Example 6 was used instead of the acrylic copolymer according to Synthesis Example 1.

Example 4-1

A separator for a secondary battery cell was manufactured according to the same method as Example 1 except that the acrylic copolymer of Synthesis Example 1 and inorganic ceramic were used in a weight ratio of 1:30.

Example 4-2

A separator for a secondary battery cell was manufactured according to the same method as Example 1 except that the acrylic copolymer of Synthesis Example 1 and inorganic ceramic were used in a weight ratio of 1:40.

Example 4-3

A separator for a secondary battery cell was manufactured according to the same method as Example 1 except that the acrylic copolymer of Synthesis Example 1 and inorganic ceramic were used in a weight ratio of 1:20.

Comparative Example 4-1

A separator for a secondary battery cell was manufactured according to the same method as Example 1 except that the acrylic copolymer of Synthesis Example 1 and inorganic ceramic were used in a weight ratio of 1:15.

Comparative Example 4-2

A separator for a secondary battery cell was manufactured according to the same method as Example 1 except that the acrylic copolymer of Synthesis Example 1 and inorganic ceramic were used in a weight ratio of 1:50.

EVALUATION EXAMPLES

Evaluation Example 1: Adhesion Force to Substrate

The separators according to Example 1, Examples 2-1 to 2-4, Comparative Examples 2-1 and 2-2, Examples 3-1 to 3-3, Comparative Examples 3-1 and 3-2, Examples 4-1 to 4-3, and Comparative Examples 4-1 and 4-2 were respectively cut to have a width of 12 mm and a length of 50 mm to prepare samples. After adhering a tape to the coating layer surface of each sample, separating the coating layer surface to which the tape was adhered 10 mm to 20 mm apart from the substrate, and fixing the substrate side not adhered with the tape into an upper grip, while the coating layer side adhered with the tape into a lower grip, with the two grips 20 mm apart, the coating layer side and the substrate side were stretched in the 180° direction and peeled off. Herein, a peeling speed was 10 mm/min, and the binding strength was obtained by three times measuring strength required to peel off the layer up to 40 mm and averaging the measurements. Peel strength results of the separators are shown in Table 2.

Evaluation Example 2: Thermal Shrinkage Rate

The separators for a lithium secondary battery according to Example 1, Examples 2-1 to 2-4, Comparative Examples 2-1 and 2-2, Examples 3-1 to 3-3, Comparative Examples 3-1 and 3-2, Examples 4-1 to 4-3, Comparative Examples 4-1 and 4-2 were respectively cut into a size of 8 cm×8 cm to prepare samples. The samples after drawing a 5 cm×5 cm-size quadrangle on the surface were inserted between paper or alumina powder, placed at 150° C. in an oven for 1 hour, and taken out of the oven, and each shrinkage ratio between machine direction (MD) and in a traverse direction (TD) was calculated by measuring sides of the quadrangles drawn on the samples. The results are shown in Table 2.

Evaluation Example 3: Air Permeability

Each time (seconds) until the separators for a lithium secondary battery according to Example 1, Examples 2-1 to 2-4, Comparative Examples 2-1 and 2-2, Examples 3-1 to 3-3, Comparative Examples 3-1 and 3-2, Examples 4-1 to 4-3, and Comparative Examples 4-1 and 4-2 permeate 100 cc of air was measured by using a permeability measuring equipment (EG01-55-1MR, Asahi Seiko Co., Ltd.), and the results are shown in Table 2.

TABLE 2

| | Adhesion force to substrate (gf) | Thermal shrinkage rate of separator 150° C., 1 hr (MD/TD) (%) | Air permeability of separator (sec/100 cc) |
|---|---|---|---|
| Example 1 | 16 | 2/1 | 132 |
| Example 2-1 | 12 | 3/4 | 132 |
| Example 2-2 | 11 | 5/7 | 133 |
| Example 2-3 | 14 | 4/5 | 134 |
| Example 2-4 | 14 | 3/4 | 134 |
| Comparative Example 2-1 | 10 | 20/21 | 136 |
| Comparative Example 2-2 | 9 | 25/24 | 135 |
| Example 3-1 | 16 | 2/2 | 132 |
| Example 3-2 | 18 | 2/3 | 132 |
| Example 3-3 | 18 | 2/2 | 130 |
| Example 3-4 | 18 | 1/2 | 130 |
| Comparative Example 3-1 | 10 | 25/24 | 140 |
| Comparative Example 3-2 | 10 | 15/12 | 140 |
| Example 4-1 | 12 | 2/2 | 134 |
| Example 4-2 | 9 | 3/2 | 133 |
| Example 4-3 | 7 | 4/5 | 132 |
| Example 4-4 | 16 | 4/5 | 140 |
| Comparative Example 4-1 | 18 | 3/2 | 155 |
| Comparative Example 4-2 | 3 | 57/59 | 128 |

Referring to Table 2, the separators according to the examples exhibited excellent adhesion force to a substrate and air permeability and in addition, showed a shrinkage rate of less than 10% at 150° C. and thus realized excellent heat resistance and adhesion characteristics.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. A separator for a lithium secondary battery, comprising a porous substrate, and
a coating layer on at least one surface of the porous substrate,
wherein the coating layer comprises an acrylic copolymer,
wherein the acrylic copolymer is represented by Chemical Formula 7,

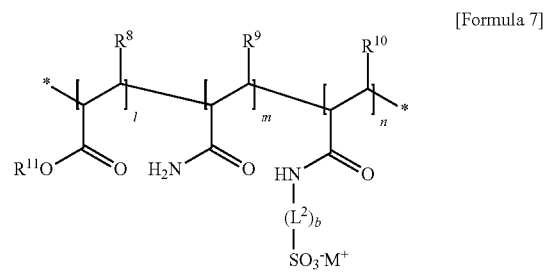

[Formula 7]

wherein in Chemical Formula 7,
$R^8$ to $R^{10}$ are independently hydrogen or a methyl group,
$R^{11}$ is hydrogen or a C1 to C6 alkyl group,
$L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group,
b is one of integers of 0 to 2,
M is an alkali metal selected from lithium, sodium, potassium, rubidium, and cesium,
$0.55 \le m \le 0.95$, $0.05 \le (l+n) \le 0.45$, $l+m+n=1$, and $0<n$, and
wherein a thickness ratio of a thickness of the coating layer to a thickness of the porous substrate is 0.1 to 0.2.

2. The separator of claim 1, wherein in Chemical Formula 7, $0.90 \le m \le 0.95$, and $0 \le l \le 0.05$, and $0<n \le 0.05$.

3. The separator of claim 1, wherein a weight average molecular weight of the acrylic copolymer is 350,000 to 970,000.

4. The separator of claim 1, wherein the coating layer comprises inorganic particles.

5. The separator of claim 4, wherein a weight ratio of the acrylic copolymer to the inorganic particles is from 1:20 to 1:40.

6. The separator of claim 4, wherein the inorganic particles comprise $Al_2O_3$, $SiO_2$, $TiO_2$, $SnO_2$, $CeO_2$, $MgO$, $NiO$, $CaO$, $GaO$, $ZnO$, $ZrO_2$, $Y_2O_3$, $SrTiO_3$, $BaTiO_3$, $Mg(OH)_2$, boehmite, or a combination thereof.

7. The separator of claim 1, wherein a thickness of the coating layer is 1 μm to 5 μm.

8. A lithium secondary battery comprising
a positive electrode, a negative electrode, and the separator of claim 1 between the positive electrode and the negative electrode.

9. A separator for a lithium secondary battery, comprising
a porous substrate, and
a coating layer on at least one surface of the porous substrate, wherein the coating layer comprises an acrylic copolymer and inorganic particles,
wherein the acrylic copolymer is represented by Chemical Formula 7,

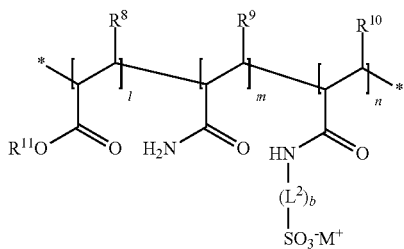

[Formula 7]

in Chemical Formula 7,
$R^8$ to $R^{10}$ are independently hydrogen or a methyl group,
$R^{11}$ is hydrogen or a C1 to C6 alkyl group,
$L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, b is one of integers of 0 to 2,
M is an alkali metal selected from lithium, sodium, potassium, rubidium, and cesium,
$0.9 \leq m \leq 0.95$, $0 \leq l \leq 0.05$, $0 < n \leq 0.05$, and $l+m+n=1$, and
wherein a weight ratio of the acrylic copolymer to the inorganic particles is from 1:20 to 1:40.

10. The separator of claim 9, wherein a weight average molecular weight of the acrylic copolymer is 350,000 to 970,000.

11. The separator of claim 9, wherein the inorganic particles comprise $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

12. The separator of claim 9, wherein a thickness of the coating layer is 1 μm to 5 μm.

13. A lithium secondary battery comprising
a positive electrode, a negative electrode, and the separator of claim 9 between the positive electrode and the negative electrode.

* * * * *